United States Patent
Agarwal et al.

(10) Patent No.: US 7,701,971 B2
(45) Date of Patent: Apr. 20, 2010

(54) SYSTEM AND METHOD FOR PROVIDING A COMPATIBILITY FEATURE IN A SESSION INITIATION PROTOCOL (SIP) ENVIRONMENT

(75) Inventors: Tripti Agarwal, Fremont, CA (US); Ho Bao, Richardson, TX (US); David R. Daiker, Chapel Hill, NC (US); Richard A. Frisk, Cary, NC (US); David Wayne Mills, Raleigh, NC (US); John K. Restrick, Jr., Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

(21) Appl. No.: 11/364,754

(22) Filed: Feb. 27, 2006

(65) Prior Publication Data

US 2007/0201510 A1   Aug. 30, 2007

(51) Int. Cl.
*H04L 12/56* (2006.01)
*H04J 1/16* (2006.01)

(52) U.S. Cl. .................. 370/467; 370/352; 370/252
(58) Field of Classification Search .......... 370/466, 370/401, 467, 352, 252; 709/228
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,757,781 A * | 5/1998 | Gilman et al. | 370/260 |
| 6,259,691 B1 * | 7/2001 | Naudus | 370/352 |
| 6,393,022 B1 | 5/2002 | Hewett et al. | 370/385 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,563,816 B1 * | 5/2003 | Nodoushani et al. | 370/352 |
| 6,567,505 B1 | 5/2003 | Omori et al. | 379/84 |
| 6,601,099 B1 | 7/2003 | Corneliussen | 709/224 |
| 6,614,781 B1 * | 9/2003 | Elliott et al. | 370/352 |
| 6,614,899 B1 | 9/2003 | Sollee et al. | 379/218.01 |
| 6,615,236 B2 | 9/2003 | Donovan et al. | 709/203 |

(Continued)

OTHER PUBLICATIONS

Cisco CallManager Administration Guide, 2003, Cisco Systems, Inc.*

(Continued)

*Primary Examiner*—John Pezzlo
(74) *Attorney, Agent, or Firm*—Baker Botts L.L.P.

(57) ABSTRACT

According to an embodiment of the present invention, an apparatus for addressing compatibility in a session protocol environment is provided that includes a communications platform operable to communicate with a first endpoint and a second endpoint and to recognize signaling capabilities of the first and second endpoints. The apparatus also includes a media termination point (MTP) operable to communicate with the endpoints and the communications platform, the media termination point being provisioned by the communications platform in a stream that involves the first and second endpoints if a signaling compatibility issue is present amongst the endpoints. If an out-of-band digit from the first endpoint is received by the communications platform, the out-of-band digit is sent to the MTP, which is operable to inject a digit associated with the second protocol into the communication session such that a mapping occurs between the digits for the first and second protocols.

20 Claims, 2 Drawing Sheets

U.S. PATENT DOCUMENTS

| | | | |
|---|---|---|---|
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,731,627 B1* | 5/2004 | Gupta et al. | 370/352 |
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 6,885,658 B1* | 4/2005 | Ress et al. | 370/352 |
| 6,909,708 B1* | 6/2005 | Krishnaswamy et al. | 370/352 |
| 6,965,614 B1* | 11/2005 | Osterhout et al. | 370/466 |
| 7,002,989 B2* | 2/2006 | Agrawal et al. | 370/467 |
| 7,139,263 B2* | 11/2006 | Miller et al. | 370/352 |
| 7,283,519 B2* | 10/2007 | Girard | 370/353 |
| 2002/0176404 A1 | 11/2002 | Girard | 370/352 |
| 2003/0002478 A1* | 1/2003 | El-Gebaly et al. | 370/352 |
| 2004/0022237 A1* | 2/2004 | Elliott et al. | 370/356 |
| 2005/0091407 A1 | 4/2005 | Vaziri et al. | 709/246 |
| 2005/0135387 A1* | 6/2005 | Rychener et al. | 370/401 |
| 2005/0268150 A1 | 12/2005 | Llabres et al. | 714/4 |
| 2006/0007954 A1 | 1/2006 | Agrawal et al. | 370/466 |
| 2007/0165598 A1* | 7/2007 | Hynonen et al. | 370/352 |
| 2007/0172051 A1* | 7/2007 | Hoffmann | 379/360 |
| 2007/0177616 A1* | 8/2007 | Jabri et al. | 370/401 |
| 2007/0297339 A1* | 12/2007 | Taylor et al. | 370/248 |

OTHER PUBLICATIONS

H. Schulzrinne and C.Agboh, "Session Initiation Protocol (SIP)-H. 323 Interworking Requirements," RFC 4123, 15 pages, Jul. 2005.

J. Rosenberg and H. Schulzrinne, "An Offer/Answer Model with the Session Description Protocol (SDP)," RFC 3264, 24 pages, Jun. 2002.

J. Rosenberg, H. Schulzrinne, and P.Kyzivat, Caller Preferences for the "Session Initiation Protocol (SIP)," RFC 3841, 25 pages, Aug. 2004.

H. Schulzrinne and S. Petrack, "RTP Payload of DTMF Digits, Telephony Tones and Telephony Signals," RFC 2833, 27 pages, May 2000.

A.B. Roach, "Session Initiation Protocol (SIP)-Specific Event Notification," RFC 3265, 34 pages, Jun. 2005.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

Notification of Transmittal of the International Search Report and the Written Opinion of the International Searching Authority, or the Declaration, International Application No. PCT/US07/01387, 7 pages, Mailed Oct. 19, 2007.

* cited by examiner

SYSTEM AND METHOD FOR PROVIDING A COMPATIBILITY FEATURE IN A SESSION INITIATION PROTOCOL (SIP) ENVIRONMENT

TECHNICAL FIELD OF THE INVENTION

This invention relates generally to communications and, more particularly, to a system and a method and for providing a compatibility feature in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, one problem associated with current SIP implementations relates to compatibility with other protocols. Where protocols are not coordinated properly, communications may not reach their intended destinations or they may not be interpreted correctly.

Accordingly, the ability to provide a communications system that consumes few resources, optimizes bandwidth, and achieves superior compatibility across diverse communication platforms presents a significant challenge for network operators, service providers, and system administrators.

SUMMARY OF THE INVENTION

From the foregoing, it may be appreciated by those skilled in the art that a need has arisen for an improved process that provides an effective solution for participants in a communications architecture. In accordance with an embodiment of the present invention, a system and a method for addressing compatibility issues are provided that substantially eliminate or greatly reduce disadvantages and problems associated with conventional communication strategies and protocols.

According to an embodiment of the present invention, an apparatus for addressing compatibility in a session protocol environment is provided that includes a communications platform operable to communicate with a first endpoint and a second endpoint and to recognize signaling capabilities of the first and second endpoints. The endpoints seek to communicate with each other in a communication session, the first endpoint is associated with a first protocol and the second endpoint is associated with a second protocol. The apparatus also includes a media termination point (MTP) operable to communicate with the endpoints and the communications platform, the media termination point being provisioned by the communications platform in a stream that involves the first and second endpoints if a signaling compatibility issue is present amongst the endpoints. If an out-of-band digit from the first endpoint is received by the communications platform, the out-of-band digit is sent to the MTP, which is operable to inject a digit associated with the second protocol into the communication session such that a mapping occurs between the digits for the first and second protocols.

In more specific embodiments of the present invention, if a match exists between the endpoints such that both of the endpoints support out-of-band messages or support RFC 2833 compliant signaling, then the MTP is not inserted into the communication session.

In other embodiments, the communications platform can perform a selected one of a plurality of mappings, the mappings being included in a group consisting of: a) a signaling connection control protocol (SCCP) to key press markup language (KPML) out-of-band dual tone multi-frequency (DTMF) mapping; b) a media gateway control protocol (MGCP) to KPML out-of-band DTMF mapping; c) an H.245 to KPML out-of-band DTMF mapping; d) a java telephony application program interface (API) (JTAPI) to KPML out-of-band DTMF mapping; and e) a telephony API (TAPI) to KPML out-of-band DTMF mapping.

In still other embodiments, the first endpoint supports out-of-band DTMF and the second endpoint supports KPML. In addition, the first endpoint is subscribed to for notifications about digits and advertisements are made to the second endpoint, the advertisements indicating the second endpoint can subscribe to the first endpoint for digits if it is interested. If an end user of the second endpoint presses a key, a NOTIFY message would be generated and received and the corresponding digit would be converted to a DTMF compatible digit.

In yet other embodiments, if the communication session is transferred, dialog is utilized in lieu of leveraging the MTP. Alternative embodiments, the communications platform is operable to perform a dynamic insertion and removal of the MTP such that policy decisions associated with signaling compatibility between the endpoints are reevaluated. The dynamic insertion and removal of the MTP can be based on a transferring of the communication session or upon discovering signaling capabilities of either of the endpoints.

Certain embodiments of the present invention may provide a number of technical advantages. For example, according to one embodiment of the present invention, an architecture and a process are provided that address flows for multiple types of communication protocols. Hence, signaling is properly coordinated in an efficient manner.

Additionally, the present invention can be implemented with minimal overhead costs because: 1) endpoints do not have to be upgraded to achieve the teachings of the present invention; and 2) media termination point (MTP) insertion can be dynamic. Moreover, the present invention can remove unused MTPs. The present invention is also scalable and, further, it effectively employs configuration information gleaned from signaling capabilities associated with endpoints.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
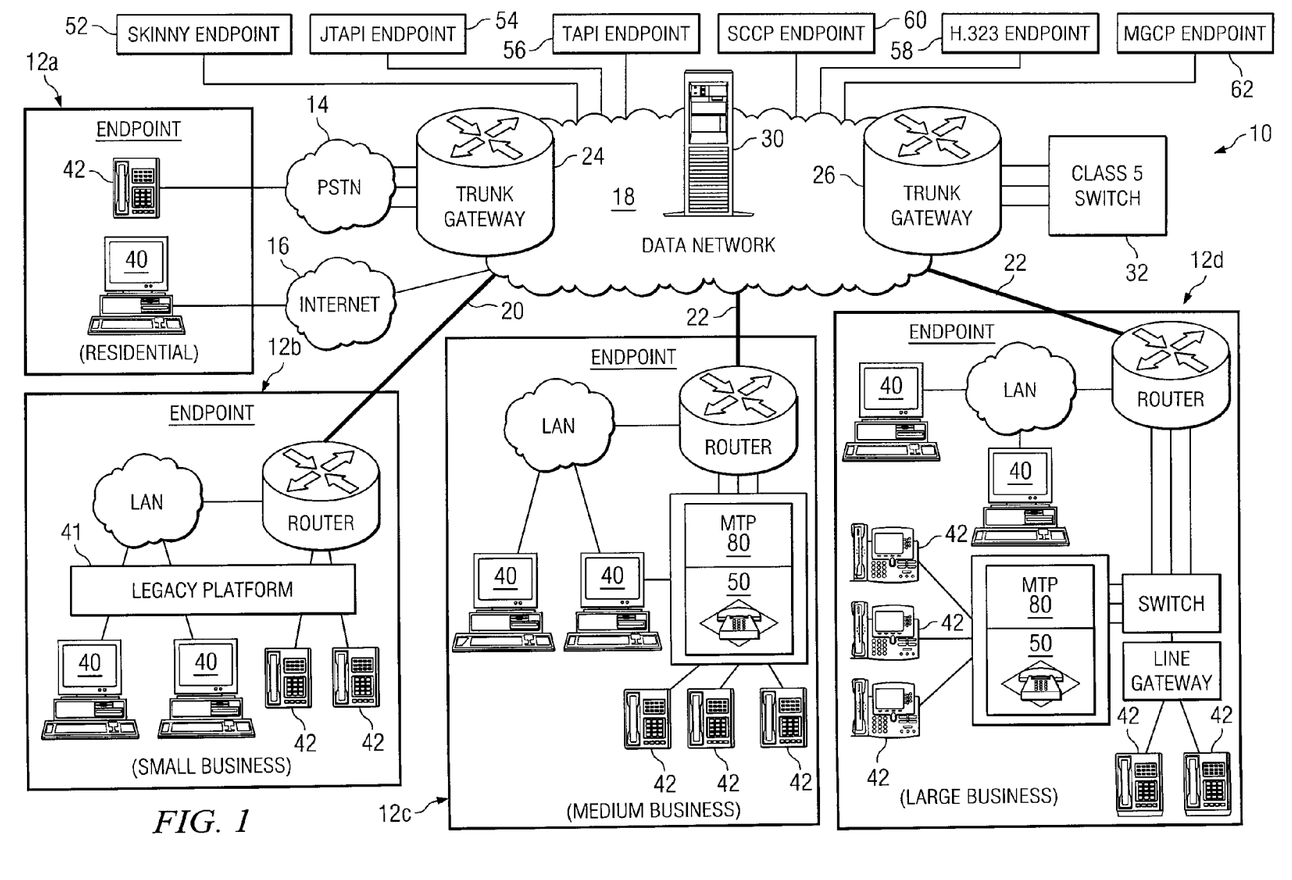
FIG. 1 is a simplified block diagram illustrating a communication system that may implement compatibility features of the present invention in accordance with one embodiment.

FIG. 1 is a simplified block diagram of a communication system 10 for communicating, receiving, and transmitting data in a session initiation protocol (SIP) environment. Communication system 10 includes endpoints 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

In accordance with the teachings of the present invention, communication system 10 achieves an effective interworking between several protocols by mapping diverse signaling in two directions. Concisely stated, communications platform 50 can effectively address the following mappings: 1) signaling connection control protocol (SCCP) to key press markup language (KPML) out-of-band dual tone multi-frequency (DTMF) mapping; 2) media gateway control protocol (MGCP) to KPML out-of-band DTMF mapping; 3) H.245 to KPML out-of-band DTMF mapping; 4) java telephony application program interface (API) (JTAPI) to KPML out-of-band DTMF mapping; and 5) telephony API (TAPI) to KPML out-of-band DTMF mapping.

Many voice protocols (SCCP, H.323, MGCP) can send DTMF in call signaling messages. The most common method for SIP networks to use involves RFC 2833, which sends DTMF in a real-time protocol (RTP) stream. To interwork between out-of-band and RFC 2833, a relay device (i.e. a media termination point (MTP)) can be inserted into the RTP path such that it can talk to a given call agent (or an endpoint). The device can relay the appropriate RFC 2833 digits for proper signaling. However, putting MTPs in the path for all calls is neither scalable nor cost effective.

In addition, for most protocols, it is expected that an endpoint can support out-of-band DTMF, or support can be easily advertised and removed. However, KPML support, once advertised cannot be removed from a dialog with any expectation that the other endpoint will react properly. For a back-to-back user agent (B2BUA), that will often change the other side of the call without replacing existing dialog, which presents a problem.

Communications system 10 can address some of these issues (and others) by employing several translation or coordination strategies, as outlined herein in this document. In accordance with one strategy, software (e.g. an algorithm) is utilized to determine when to insert (and also when to remove) an MTP from a call for DTMF relay from an arbitrary protocol to SIP. The basic algorithm is as follows: if one side supports only out-of-band and the other side supports only RFC 2833, then an MTP is inserted to relay digits. However, due to complexities in the voice protocols, there are many things that have to be done to ensure DTMF will work, while minimizing use of MTPs. In some cases, it is useful to simultaneously do out-of-band and RFC 2833 DTMF. In these cases, an MTP can be inserted even when there is a match between the endpoints to allow an endpoint that normally only supports one method to provide DTMF using both methods.

In general, communications platform 50 has the ability to implement rules for dynamically adding and removing MTPs for DTMF relay between out-of-band DTMF and RFC 2833 DTMF (and associated signaling strategies). Other features and operational capabilities of communications platform 50 are also present, and are described in greater detail below in the context of several flows.

Before turning to those operations, the architecture and components of FIG. 1 are described for purposes of discussion and completeness. It should be noted that the internal structure of the system of FIG. 1 is malleable and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

Communication system 10 includes a skinny endpoint 52, a JTAPI endpoint 54, a TAPI endpoint 56, an SCCP endpoint 60, an H.323 endpoint 58, and an MGCP endpoint 62. (It should be noted that, in certain nomenclatures, the SCCP and skinny endpoints are virtually equivalent. The present invention is intended to cover applications for both, or any permutations thereof.) Endpoints 52-62 are merely representative of some of the types of endpoints that can be accommodated by the presentation invention. A given endpoint could certainly accommodate, or be equipped to handle, several of these protocols or other protocols. The separation of these endpoints into devices that include specific protocols is arbitrary and could be changed considerably according to particular needs and architectures.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Endpoint 12b represents a small business entity, which consists of a local area network (LAN), a router, several computers 40, and several telephones 42. Endpoint 12c represents a medium business entity, which consists of a LAN, router, a private branch exchange (PBX) or key system, several computers 40, and several telephones 42. Endpoint 12d is a large business entity, which consists of a LAN, a router, a switch, a line gateway, several computers 40, and several telephones 42.

Thus, endpoints 12a-d are SIP-compatible elements that include hardware and/or software that is operable to receive and to transmit data (directly or indirectly) and to implement the compatibility features as outlined herein. Note that the term "endpoint" encompasses a myriad of potential devices and infrastructure that may benefit from the operations of communication system 10. Endpoints 12a-d may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

MTPs extend supplementary services, such as call hold, call transfer, call park, and conferencing, that are otherwise not available when a call is routed to an H.323 endpoint (or any other endpoints, such as any of those illustrated in FIG. 1). An MTP can accept two full-duplex coder-decoder (CODEC) stream connections (e.g. G.711). MTPs can bridge the media streams between two connections. The streaming data that is received from the input stream on one connection passes to the output stream on the other connection and vice versa. In addition, the MTP trancodes a-law to mu-law (and vice versa) and adjusts packet sizes as required by the two connections. It can also transcode other code types, as the MTP is not confined to ulaw or alaw protocols.

Each MTP belongs to a device pool, which specifies, in priority order, the list of communications platforms 50 to which the devices that are members of the device pool should attempt to register. This list represents a communications platform 50 group. The communications platform 50 controls MTP resources. When more than one MTP is registered with a given communications platform 50, that communications platform 50 controls the set of resources for each MTP. MTPs can be distributed across a networked system as desired.

When the communications platform 50 determines that a call endpoint requires an MTP, it allocates an MTP resource from the MTP that has the least active streams. That MTP resource gets inserted into the call on behalf of the endpoint. MTP resource use remains invisible to both the users of the system and to the endpoint on whose behalf it was inserted. If an MTP resource is not available when it is needed, the call connects without using an MTP resource, and that call does not have supplementary services. An MTP device can be added through communications platform 50 administration.

Communications platform 50 requires an RFC 2833 DTMF-compliant MTP device to make SIP calls. The current standard for SIP uses inband payload types to indicate DTMF tones, and AVVID components such as SCCP IP phones support only out-of-band payload types. Thus, an RFC 2833-compliant MTP device monitors for payload type and acts as a translator between inband and out-of-band payload types. With the MTP device, any service that requires a media change (such as call hold) happens transparently. No need exists to send any media update signal to the SIP proxy server.

A media resource manager (MRM), which is a software component in communications platform 50, primarily functions for resource registration and resource reservation. Each MTP device that is defined in the database registers with the MRM. The MRM keeps track of the total available MTP devices in the system and of which devices have available resources.

During resource reservation, the MRM determines the number of resources, identifies the media resource type (in this case, the MTP), and the location of the registered MTP device. The MRM updates its shared resource table with the registration information and propagates the registered information to other communications platforms.

It should also be noted that the internal structure of endpoints 12a-d is malleable and can be readily changed, modified, rearranged, or reconfigured in order to achieve their intended operations as they pertain to the mapping function. Note also that endpoints 12c and 12d each include a communications platform 50, which is operable to communicate with any number of endpoints/user agents/devices (e.g. telephones 42 and/or computer 40). In one embodiment, communications platform 50 is a Call Manager element, which is manufactured by Cisco Systems, Inc. of San Jose, Calif. The Call Manager element is SIP-enabled, and it can readily accommodate other protocols (e.g., H.323). In other embodiments, communications platform 50 is any suitable component (e.g. a gateway, a switch, a router, a bridge, a state machine, a processor, etc.) that is operable to interface with endpoints/end-user devices (e.g. telephone 42, computer 40, etc.).

Software and/or hardware may reside in communications platform 50 in order to achieve the teachings of the compatibility and mapping features of the present invention. However, due to their flexibility, communication platform 50 may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of communications platform 50 in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

Many applications require the creation and management of a session, where a session is considered an exchange of data between an association of participants. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions, such as multicast conferences. Media can be added to and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

As SIP gains notoriety within the communications industry, it has become apparent that architectures need to be adapted to accommodate SIP communication sessions in an optimal fashion. SIP trunks are interfaces used to receive SIP messages from a SIP network. Those messages can be brought into communications platform 50 (e.g. the Call Manager). The messages may be brought into the platform using a back-to-back user agent (B2BUA) fashion, which may be included in any communications platform 50 (or provided in some other appropriate location or provided as its own separate component). As used herein in this document, the term "agent" refers to any element (e.g. a B2BUA) that seeks to facilitate a session involving a given endpoint. An agent may be included in the endpoint in any suitable fashion (e.g. within communications platform 50 or provided external thereto).

In a given architecture, the different devices involved in a call are located throughout the network. In addition, the bearer path (i.e. the path that actually carries voice packets) is different from the signaling path, which exchanges signaling data. Thus, a common configuration for many SIP architectures is to have a real-time protocol (RTP) stream that can be leveraged to deliver appropriate data.

Figure 2:
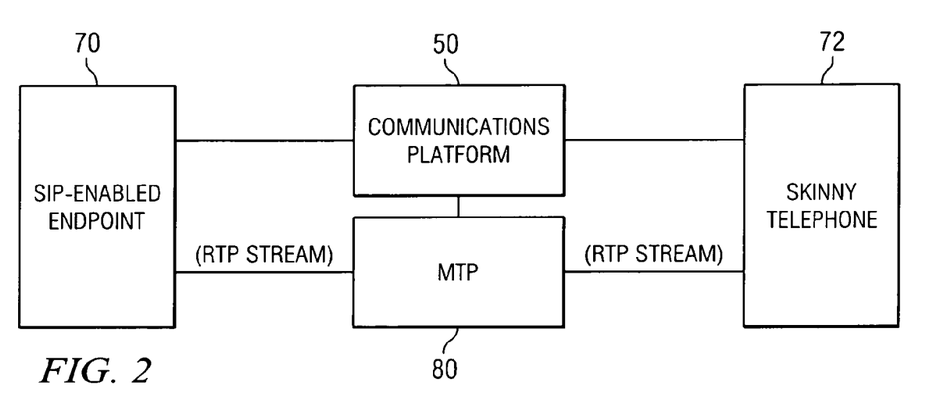
FIG. 2 is a simplified block diagram illustrating a simple flow according to the teachings of one embodiment of the invention.

FIG. 2 is a simplified block diagram that can be used to explain some of the teachings of the present invention. Specifically, FIG. 2 attempts to illustrate how two endpoints, having diverse signaling protocols, can effectively communicate. FIG. 2 includes communications platform 50, a SIP-enabled endpoint 70, a skinny telephone 72, and an MTP 80.

As noted above, most SIP-endpoints support RFC 2833; however there are some ways of signaling DTMF out-of-band in SIP as well. One particular method for doing this is KPML. KPML is a markup that enables presentation-free user interfaces. The key press stimulus package is a SIP event notification package that uses the SUBSCRIBE and NOTIFY methods of SIP. The subscription filter and notification report bodies use the keypad markup language.

In particular, the "KPML" event package enables "dumb phones" and "gateways" which receive signals from dumb phones to report user key-press events. Colloquially, this mechanism provides for "digit reporting" or "DTMF reporting." The capability eliminates the need for "hair-pinning" (routing media into and then out of the same device) through a media server or duplicating all the DTMF events, when an application server needs to trigger mid-call service processing on DTMF digit patterns.

A goal of KPML is to fit in an extremely small memory and processing footprint. The name of the XML document, KPML, reflects its legacy support role. The public switched telephony network (PSTN) accomplished signaling by transporting DTMF tones in the bearer channel (in-band signaling) from the user terminal to the local exchange.

Voice-over-IP networks transport in-band signals with actual DTMF waveforms or RFC 2833 packets. In RFC 2833, the signaling application inserts RFC 2833 named signal packets as well as, or instead of, generating tones in the media path. The receiving application receives the signal information in the media stream. RFC 2833 tones are ideal for conveying telephone-events point-to-point in an RTP stream, as in the context of straightforward sessions like a 2-party call or simple, centrally mixed conference. However, there are other environments where additional or alternative requirements are needed. These other environments include protocol translation, which is addressed by many of the teachings of the present invention.

Referring back to FIG. 2, there are several ways to initiate DTMF signaling. One way is to place this information in the call signaling. The line between the call agent and the endpoints (or telephones) could be associated with SIP, H.323, skinny, etc. Communications platform 50 can send DTMF out-of-band. RFC 2833 defines a way to send digits in the RTP stream that goes directly between the endpoints. The problem is that in some instances, one endpoint may only support an out-of-band method for communicating digits and the other only supports the RFC 2833 method of sending digits in the RTP stream. In such a case, the digits will not reach their intended destination: for either endpoint.

Communications platform 50 addresses these issues, in accordance with one embodiment of the present invention, by inserting MTP 80 in the RTP stream between the endpoints. The MTP has a skinny connection to communications platform 50. In this scenario, the MTP can translate information in two directions. For example, if an out-of-band digit is received by communications platform 50, the digit is sent to the MTP, which injects an RFC 2833 digit into the flow. This digit gets sent to the endpoint that understands the RFC 2833 protocol. In the reverse direction, when a digit is pressed on a SIP-enabled endpoint, it is sent to the MTP, which coverts the RFC 2833 digit into a skinny format. This message is then sent to communications platform 50, which sends the signal down to the skinny endpoint that understands out-of-band signaling.

In a similar example flow, consider a case in which an endpoint signals DTMF out-of-band and another endpoint is an H.323 endpoint. The out-of-band endpoint places a call through communications platform 50 and to the H.323 endpoint. Once the communications platform 50 is aware of the DTMF capabilities, it will recognize that these endpoints do not share a DTMF protocol. Communications platform 50 will subsequently identify resources, such as an MTP (i.e. a DTMF relay point) to assist in this communication. Communications platform 50 will put this MTP in the media stream that it is negotiating and perform the translation as specified above. Other scenarios could readily be accommodated, for example flows that involve MGCP, SCCP, TAPI, JTAPI, etc.

Thus, communications platform can make policies only applicable to certain calls. In one embodiment, communications platform 50 evaluates the capabilities of each endpoint before electing to utilize the MTP. If there is a mismatch, where one endpoint only does out-of-band and the other side only does RFC 2833 data, then an MTP would be inserted into the call flow. If there is a match such that both sides support out-of-band messages or both sides support the RFC 2833 data, then the MTP is not inserted in this particular flow.

Another area of optimization for communications platform 50 relates to a dynamic insertion and removal of the MTP. As the call changes, these elections can be changed or modified. For example, as a device (e.g. a call agent) transfers a call leg from one location to another location, then this policy decision (as to whether to employ an MTP) is remade for the communication session.

There are other operations of communications platform 50 that address mismatches. A special situation exists when one endpoint supports out-of-band DTMF and the other endpoint supports KPML. Based on the fact that one side supports out-of-band DTMF, a call agent could subscribe to that endpoint for notifications about digits. In addition, advertisements would be made to the KPML endpoint that this endpoint can subscribe to us for digits if it is interested. If the end user of the KPML endpoint presses a key, a NOTIFY message would be received. That digit would be converted to the appropriate protocol. In the other direction, where for example a digit is pressed at an endpoint supporting H.323, an H.245 message would be received. If a subscription exists from the SIP endpoint, a NOTIFY would be sent to it.

Yet another operation of communications platform 50 addresses some of the other complexities associated with KPML. Typically, RFC 2833 is negotiated at the same time as when decisions are made about audio codecs (e.g. 711, 729, etc.). Out-of-band DTMF is generally negotiated at that point, or it is simply assumed. Thus, in those cases, communications platform 50 is already knowledgeable about the capabilities of the endpoints (e.g. whether they can support H.323 or out-of-band, etc.).

KPML is advertised in a somewhat awkward manner. When the INVITE message is sent out, which is the first SIP message; ideally KPML would be advertised at this point. However, if the negotiations of one of the endpoints are only going to take place at a later time, communications platform 50 is not able to identify which protocols the endpoint currently supports. Thus, if KPML is advertised, communications platform 50 may be stuck supporting KPML even though the caller is incapable of performing out-of-band signaling. Hence, an MTP may be employed in certain cases where it was not necessary.

Still another difficulty arises because of the way DTMF functions. DTMF is a two-way communications protocol, which solicits whether a given endpoint would like to receive digits from another endpoint. It asks the questions: 1) Do you (as an endpoint) want to receive digits from me? and 2) Do I (as an endpoint) want to receive digits from you? Thus, it is perfectly acceptable for an endpoint to acknowledge that it supports KPML and, hence, an INVITE should be sent, and for the other endpoint to reply that it does not support KPML. When an endpoint replies that it does not support KPML, it does not mean that it does not understand KPML necessarily. Instead, the endpoint may simply be prohibiting the other endpoint from subscribing to it for digits. This does not mean that this endpoint will not subscribe to the other endpoint for digits. Hence, there is no effective way of knowing if the other endpoint is interested in receiving digits from you until a subscription is created. This creates a number of difficulties.

For example, IVR may be implemented in such a way that a call may be placed to it, but it will never provide digits back to the caller. IVR is configured to receive digits from an endpoint (e.g. when an end user accesses his e-mail) and not to send digits. For example, in a voicemail context, a voicemail system could answer and not advertise that it supports KPML. Hence, there is no way for the call agent to truly know whether an endpoint is supporting certain protocols. This knowledge (which communications platform 50 would not have) is problematic because there are decisions being made about when to use an MTP (e.g. where the endpoint supports out-of-band or RFC 2833 is necessary).

There are a multitude of ways in which communications platform 50 can address these issues (some of which were introduced above). One proposed solution recognizes that when the call agent extends an INVITE it does not always know the callee's DTMF capabilities. So these parameters will be set based on defaults for either the protocol or the configuration of the caller (typically out-of-band is assumed for non-SIP callers, RFC 2833 for SIP callers).

A second proposed solution recognizes that once support for KPML (a method of supporting out-of-band DTMF in SIP) in a dialog is advertised, it cannot be removed. This can necessitate MTP insertion in cases where there is not a DTMF mismatch. Consider an example where A supports out-of-band DTMF and elects to call endpoint B. In this case, endpoint B is a SIP endpoint so KPML is advertised. Endpoint B also supports RFC 2833. At this point, no MTP is needed. Endpoint B subscribes for KPML notifications. Later, endpoint A transfers endpoint B to endpoint C, which supports only RFC 2833. If the call agent is a B2BUA and it does not replace the dialog to endpoint B, an MTP will be needed to service the subscription. This occurs even if endpoint C had called endpoint B because in a basic call there would have been no MTP. Replacing the dialog is another way to deal with this issue.

A third proposed solution operates in the following manner. If later in a call, new information about a sides' capabilities are discovered, or if one of the parties changes, an MTP can be added or removed dynamically.

A fourth proposed solution operates in the following manner. Some device types do not typically need to receive digits but do need to be able to provide them: one example being phones. To further minimize DTMF usage, when calling between devices known to be like phones (usually via configuration): 1) only insert an MTP if one of the devices needs to be a receiver and there is a mismatch. [If both devices do not need to receive digits then even in the mismatch case no MTP is needed.]; and 2) when calling a device that does not need to receive digits, do not advertise KPML. If an endpoint advertises KPML, it can still be subscribed to. The reason to avoid advertising KPML in this case is that it might necessitate an MTP to support that KPML advertisement later in the call even though the device will never subscribe.

Hence, the present invention can accommodate asymmetrical capabilities in a myriad of ways. As outlined above, some of the methods employed to address these issues are based on default parameters, recognized or discovered capabilities, or proffered signaling. In a general sense, communications platform 50 is capable of addressing virtually any situation in which two incompatible protocols are present and there is a need to interact or cooperate in terms of a communication session.

It is important to note that the stages and steps described above illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing compatibility functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints 12a-d. Using analogous reasoning, the routers and switches illustrated by FIG. 1 may be supplanted by bridges, gateways, or any other suitable devices that are conducive to network communications. In addition, while the foregoing discussion has focused on SIP, any other suitable session protocol may benefit from the compatibility teachings provided herein. The present invention is not confined to the SIP platform or to the identified signaling protocols.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for addressing compatibility in a session protocol environment, comprising:
   a communications platform comprising at least one memory element, the communications platform operable to communicate with a first endpoint and a second endpoint and to recognize signaling capabilities of the first and second endpoints, wherein the endpoints seek to communicate with each other in a communication session, and wherein the first endpoint is associated with a first protocol and the second endpoint is associated with a second protocol; and
   a media termination point (MTP) operable to communicate with the endpoints and the communications platform, wherein the media termination point is:
      dynamically inserted by the communications platform into a stream that involves the first and second endpoints if a signaling compatibility issue is present amongst the endpoints, wherein if an out-of-band digit from the first endpoint is received by the communications platform, the out-of-band digit is sent to the MTP, which is operable to inject a digit associated with the second protocol into the communication session such that a mapping occurs between the digits for the first and second protocols; and
      dynamically removed by the communications platform from the stream in response to a determination that the signaling compatibility issue is no longer present.

2. The apparatus of claim 1, wherein the first endpoint is a SIP-enabled endpoint.

3. The apparatus of claim 1, wherein the first endpoint understands out-of-band signaling.

4. The apparatus of claim 1, wherein the communications platform executes signaling mapping policies for only selected communication sessions.

5. The apparatus of claim 1, wherein if a match exists between the endpoints such that both of the endpoints support out-of-band messages or support RFC 2833 compliant signaling, then the MTP is not inserted into the communication session.

6. The apparatus of claim 1, wherein the communications platform can perform a selected one of a plurality of mappings, the mappings being included in a group consisting of:
   a) a signaling connection control protocol (SCCP) to key press markup language (KPML) out-of-band dual tone multi-frequency (DTMF) mapping;
   b) a media gateway control protocol (MGCP) to KPML out-of-band DTMF mapping;
   c) an H.245 to KPML out-of-band DTMF mapping;
   d) a java telephony application program interface (API) (JTAPI) to KPML out-of-band DTMF mapping; and
   e) a telephony API (TAPI) to KPML out-of-band DTMF mapping.

7. The apparatus of claim 1, wherein compatibility parameters will be set based on defaults for either a protocol or a configuration of the endpoints.

8. The apparatus of claim 1, wherein if the communication session is transferred, dialog is utilized in lieu of leveraging the MTP.

9. A method for addressing compatibility in a session protocol environment, comprising:
   communicating with a first endpoint and a second endpoint;
   recognizing signaling capabilities of the first and second endpoints, wherein the endpoints seek to communicate with each other in a communication session, and wherein the first endpoint is associated with a first protocol and the second endpoint is associated with a second protocol;
   dynamically inserting, by altering at least one memory element, a media termination point (MTP) operable to communicate with the endpoints and a communications platform, the media termination point being dynamically inserted by the communications platform in a stream that involves the first and second endpoints if a signaling compatibility issue is present amongst the endpoints, wherein if an out-of-band digit from the first endpoint is received by the communications platform, the out-of-band digit is sent to the MTP, which is operable to inject a digit associated with the second protocol into the communication session such that a mapping occurs between the digits for the first and second protocols; and
   dynamically removing the MTP from the stream in response to a determination that the signaling compatibility issue is no longer present.

10. The method of claim 9, further comprising:
    executing signaling mapping policies for only selected communication sessions.

11. The method of claim 9, wherein if a match exists between the endpoints such that both of the endpoints support out-of-band messages or support RFC 2833 compliant signaling, then the MTP is not inserted into the communication session.

12. The method of claim 9, wherein a selected one of a plurality of mappings can be performed, the mappings being included in a group consisting of:
    a) a signaling connection control protocol (SCCP) to key press markup language (KPML) out-of-band dual tone multi-frequency (DTMF) mapping;
    b) a media gateway control protocol (MGCP) to KPML out-of-band DTMF mapping;
    c) an H.245 to KPML out-of-band DTMF mapping;
    d) a java telephony application program interface (API) (JTAPJ) to KPML out-of-band DTMF mapping; and
    e) a telephony API (TAPI) to KPML out-of-band DTMF mapping.

13. The method of claim 9, wherein compatibility parameters will be set based on defaults for either a protocol or a configuration of the endpoints.

14. The method of claim 9, wherein if the communication session is transferred, dialog is utilized in lieu of leveraging the MTP.

15. Computer readable storage medium comprising software for addressing compatibility in a session protocol environment, the software comprising computer code that, when executed by a computer, is operable to:
    communicate with a first endpoint and a second endpoint;

recognize signaling capabilities of the first and second endpoints, wherein the endpoints seek to communicate with each other in a communication session, and wherein the first endpoint is associated with a first protocol and the second endpoint is associated with a second protocol; and dynamically insert a media termination point (MTP) operable to communicate with the endpoints and a communications platform, the media termination point being dynamically inserted by the communications platform in a stream that involves the first and second endpoints if a signaling compatibility issue is present amongst the endpoints, wherein if an out-of-band digit from the first endpoint is received by the communications platform, the out-of-band digit is sent to the MTP, which is operable to inject a digit associated with the second protocol into the communication session such that a mapping occurs between the digits for the first and second protocols; and dynamically remove the MTP from the stream in response to a determination that the signaling compatibility issue is no longer present.

16. The medium of claim 15, wherein the code is further operable to:

execute signaling mapping policies for only selected communication sessions.

17. The medium of claim 15, wherein if a match exists between the endpoints such that both of the endpoints support out-of-band messages or support RFC 2833 compliant signaling, then the MTP is not inserted into the communication session.

18. The medium of claim 15, wherein a selected one of a plurality of mappings can be performed, the mappings being included in a group consisting of:
   a) a signaling connection control protocol (SCCP) to key press markup language (KPML) out-of-band dual tone multi-frequency (DTMF) mapping;
   b) a media gateway control protocol (MGCP) to KPML out-of-band DTMF mapping;
   c) an H.245 to KPML out-of-band DTMF mapping;
   d) a java telephony application program interface (API) (JTAPI) to KPML out-of-band DTMF mapping; and
   e) a telephony API (TAPI) to KPML out-of-band DTMF mapping.

19. The medium of claim 15, wherein compatibility parameters will be set based on defaults for either a protocol or a configuration of the endpoints.

20. The medium of claim 15, wherein if the communication session is transferred, dialog is utilized in lieu of leveraging the MTP.

* * * * *